(12) United States Patent
Antonio et al.

(10) Patent No.: US 12,475,385 B2
(45) Date of Patent: Nov. 18, 2025

(54) DETERMINING A FIT-FOR-PURPOSE RATING FOR A TARGET PROCESS AUTOMATION

(71) Applicant: Accenture Global Solutions Limited, Dublin (IE)

(72) Inventors: Emmanuel Benbinuto Antonio, Mandaluyong (PH); Franklin Chuatiu Yan, Taguig (PH); Maria Carlita Grospe, Mandaluyong (PH); Jonathan Cioco, Quezon (PH); Ray Jeremiah Tagalo Omapoy, Marikina (PH)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1048 days.

(21) Appl. No.: 17/499,432

(22) Filed: Oct. 12, 2021

(65) Prior Publication Data

US 2023/0111043 A1 Apr. 13, 2023

(51) Int. Cl.
*G06N 5/022* (2023.01)
*G06N 5/04* (2023.01)

(52) U.S. Cl.
CPC ............... *G06N 5/022* (2013.01); *G06N 5/04* (2013.01)

(58) Field of Classification Search
CPC .... G06N 20/00; G06N 20/10; G06Q 30/0202; G06Q 10/04; G06Q 10/06393;

(Continued)

(56) References Cited

U.S. PATENT DOCUMENTS

2007/0297516 A1 12/2007 Lee
2016/0014042 A1* 1/2016 Kampas .................. H04L 47/80
                                                                    709/226

(Continued)

FOREIGN PATENT DOCUMENTS

DE       112017007171 T5 * 11/2019 ........... G06F 9/5027

OTHER PUBLICATIONS

E. Aumayr, et al. "Probabilistic Knowledge-Graph based Workflow Recommender for Network Management Automation," 2019 IEEE 20th International Symposium on "A World of Wireless, Mobile and Multimedia Networks", Washington, DC, 2019, pp. 1-7 https://ieeexplore.ieee.org/document/8793049?source=IQplus (Year: 2019).*

*Primary Examiner* — Jerry O'Connor
*Assistant Examiner* — Michael R Koester
(74) *Attorney, Agent, or Firm* — Mannava & Kang, P. C

(57) ABSTRACT

A device may receive input data identifying variables and features associated with a target process automation, and may receive historical data associated with the target process. The device may process the input data, with a model, to calculate a future process score, a future integration score, a current process score, and a current integration score, and may calculate a combined score based on the scores. The device may calculate a calibrated combined score based on the combined score and a calibration factor, and may calculate an initial fit-for-purpose score for the target process automation based on the calibrated combined score and a probability metric. The device may generate a refined fit-for-purpose score based on the initial fit-for-purpose score and the historical data, and may determine recommendations for the target process automation based on the refined fit-for-purpose score. The device may perform one or more of the recommendations.

18 Claims, 11 Drawing Sheets

(58) Field of Classification Search
CPC .............. G06Q 10/0635; G06Q 10/06; G06Q 30/0201; G05B 19/042
See application file for complete search history.

(56) References Cited

U.S. PATENT DOCUMENTS

| | | |
|---|---|---|
| 2017/0161640 A1 | 6/2017 | Shamir et al. |
| 2019/0347586 A1* | 11/2019 | Kaulgud .......... G06Q 10/06393 |
| 2020/0073639 A1* | 3/2020 | Prasad ..................... G06F 8/10 |
| 2021/0383248 A1* | 12/2021 | Schimpfky ............ G06N 5/025 |
| 2022/0092668 A1* | 3/2022 | Lu ........................... G06N 5/04 |

* cited by examiner

DETERMINING A FIT-FOR-PURPOSE RATING FOR A TARGET PROCESS AUTOMATION

BACKGROUND

There is a growing need to automate processes, leverage features of automation and service management tools, and provide complete insights into all aspects of automation workflow processes.

SUMMARY

Some implementations described herein relate to a method. The method may include receiving input data identifying variables and features associated with a target process automation, and receiving historical data identifying prior implementations and assets associated with the target process. The method may include processing the input data, with a machine learning model, to calculate a future process score, a future integration score, a current process score, and a current integration score, and calculating a combined score based on the future process score, the future integration score, the current process score, and the current integration score. The method may include calculating a calibrated combined score based on the combined score and a calibration factor derived from the historical data, and calculating an initial fit-for-purpose score for the target process automation based on the calibrated combined score and a probability metric. The method may include generating a refined fit-for-purpose score for the target process automation based on the initial fit-for-purpose score and the historical data, and determining recommendations for the target process automation based on the refined fit-for-purpose score and historical recommendations provided in the historical data. The method may include performing one or more of the recommendations.

Some implementations described herein relate to a device. The device may include one or more memories and one or more processors coupled to the one or more memories. The one or more processors may be configured to receive input data identifying variables and features associated with a target process automation, and receive historical data identifying prior implementations and assets associated with the target process. The one or more processors may be configured to process the input data, with a machine learning model, to calculate a future process score, a future integration score, a current process score, and a current integration score, and calculate a combined score based on the future process score, the future integration score, the current process score, and the current integration score. The one or more processors may be configured to calculate a calibrated combined score based on the combined score and a calibration factor derived from the historical data, and calculate an initial fit-for-purpose score for the target process automation based on the calibrated combined score and a probability metric. The one or more processors may be configured to generate a refined fit-for-purpose score for the target process automation based on the initial fit-for-purpose score and the historical data, and determine recommendations for the target process automation based on the refined fit-for-purpose score and historical recommendations provided in the historical data. The one or more processors may be configured to perform one or more of the recommendations.

Some implementations described herein relate to a non-transitory computer-readable medium that stores a set of instructions for a device. The set of instructions, when executed by one or more processors of the device, may cause the device to receive input data identifying variables and features associated with a target process automation, and process the input data, with a machine learning model, to calculate a future process score, a future integration score, a current process score, and a current integration score. The set of instructions, when executed by one or more processors of the device, may cause the device to calculate a combined score based on the future process score, the future integration score, the current process score, and the current integration score, and calculate a calibrated combined score based on the combined score and a calibration factor derived from historical data identifying prior implementations and assets associated with the target process. The set of instructions, when executed by one or more processors of the device, may cause the device to calculate an initial fit-for-purpose score for the target process automation based on the calibrated combined score and a probability metric, and generate a refined fit-for-purpose score for the target process automation based on the initial fit-for-purpose score and the historical data. The set of instructions, when executed by one or more processors of the device, may cause the device to determine recommendations for the target process automation based on the refined fit-for-purpose score and historical recommendations provided in the historical data. The set of instructions, when executed by one or more processors of the device, may cause the device to perform one or more of the recommendations.

DETAILED DESCRIPTION

Figure 1A:
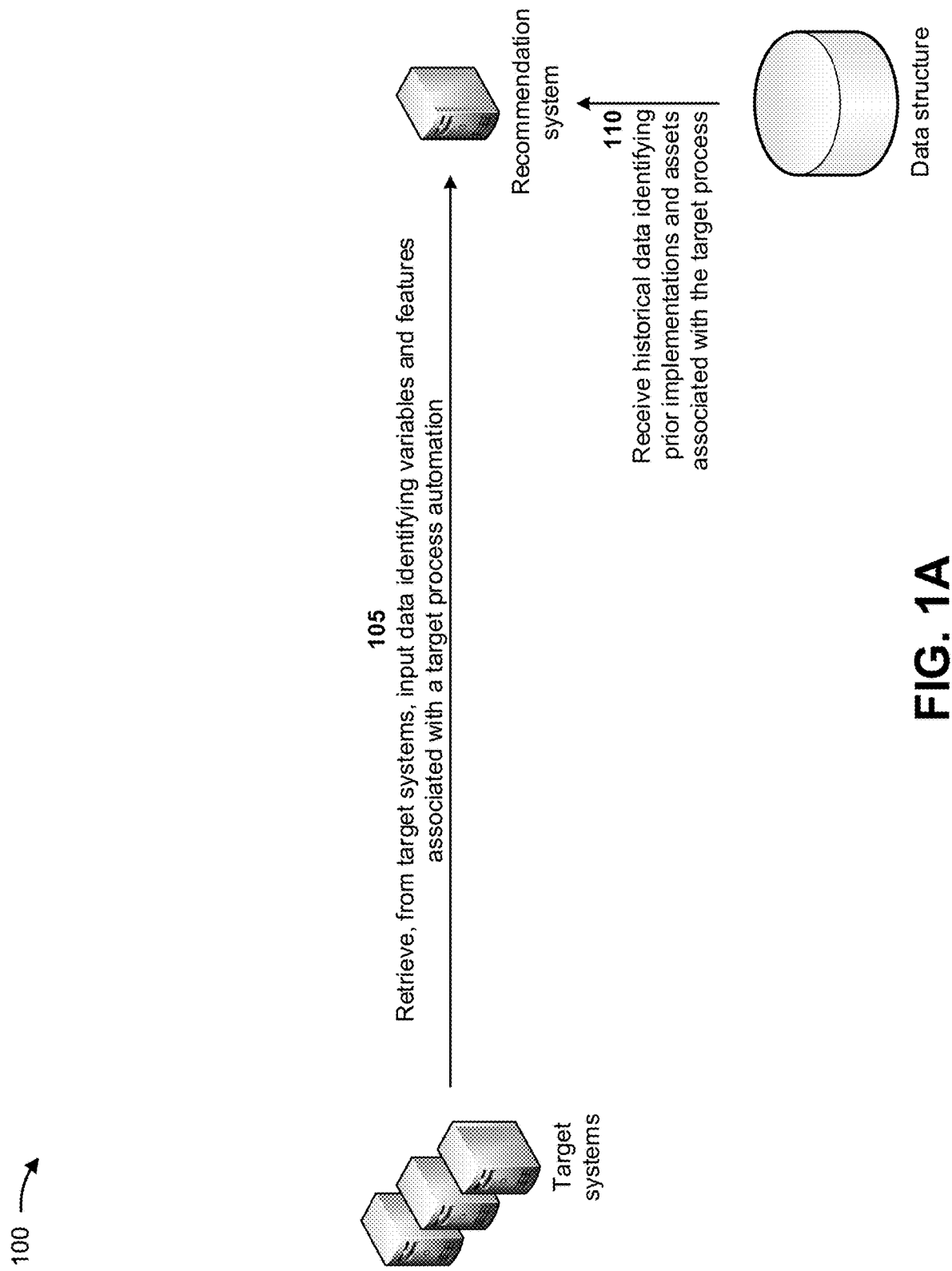
FIGS. 1A-1G are diagrams of an example implementation described herein.

The following detailed description of example implementations refers to the accompanying drawings. The same reference numbers in different drawings may identify the same or similar elements.

An automation often relies on orchestrating numerous tools and/or other actions, such as collecting user consent through emails and/or online forms, triggering custom scripts, integrating with third-party tools, and/or the like. However, an entity may be unable rate an automation as fit-for-purpose (FFP) relative to the entity's objectives for the automation. FFP may refer to a combination of automation techniques and associated processes relative to achieving predefined goals of the automation. For example, prior to implementing the automation, the entity may wish to determine whether particular tools are FFP for achieving goals of the automation. Without an adequate automation rating system, the entity may be unable to make this determination. Therefore, current techniques for implementing an automation consume computing resources (e.g., processing resources, memory resources, communication resources, and/or the like), networking resources, and/or the like associated with generating an erroneous automation, identifying errors in the erroneous automation, correcting the erroneous automation, configuring and purchasing tools for the erroneous automation, and/or the like.

Some implementations described herein relate to a recommendation system that solves the technical problem of determining a FFP rating for a target process automation. For example, the recommendation system may receive input data identifying variables and features associated with a target process automation, and may receive historical data identifying prior implementations and assets associated with the target process. The recommendation system may process the input data, with a machine learning model, to calculate a future process score, a future integration score, a current process score, and a current integration score, and may calculate a combined score based on the future process score, the future integration score, the current process score, and the current integration score. The recommendation system may calculate a calibrated combined score based on the combined score and a calibration factor derived from the historical data, and may calculate an initial FFP score for the target process automation based on the calibrated combined score and a probability metric. The recommendation system may generate a refined FFP score for the target process automation based on the initial FFP score and the historical data, and may determine recommendations for the target process automation based on the refined FFP score and historical recommendations provided in the historical data. The recommendation system may perform one or more of the recommendations.

In this way, the recommendation system determines a FFP rating for a target process automation. The recommendation system may process multiple variables (e.g., available automation levers in an automation landscape), and may determine an integrability of the automation levers. The recommendation system may determine an applicability of each automation lever to automate a target process in order to quantify FFP automation. The recommendation may calculate a FFP score for the target process automation and may utilize the FFP score to provide and/or implement recommendations with respect to the target process automation. For example, the recommendation system can be configured to automatically implement changes to hardware and/or software to achieve a target process automation goal. This, in turn, conserves computing resources, networking resources, and/or the like that would otherwise have been consumed in generating an erroneous automation, identifying errors in the erroneous automation, correcting the erroneous automation, configuring and purchasing tools for the erroneous automation, and/or the like.

FIGS. 1A-1G are diagrams of an example 100 associated with determining a FFP rating for a target process automation. As shown in FIGS. 1A-1G, example 100 includes multiple target systems and a recommendation system. Each of the target systems may include an application server, a client server, a web server, a database server, a host server, a proxy server, a virtual server, or a server in a cloud computing system. The recommendation system may include a system that determines a FFP rating for a target process automation. Further details of the target systems and the recommendation system are provided elsewhere herein.

As shown in FIG. 1A, and by reference number 105, the recommendation system may retrieve, from one or more of the target systems, input data identifying variables and features associated with a target process automation. For example, the recommendation system may continuously or periodically provide, to the target systems, requests for the input data, and may receive the input data from the target systems based on the requests. In some implementations, the recommendation system may continuously or periodically review data produced by the target systems for the target process, and may retrieve the input data from the data produced by the target systems.

In some implementations, the input data may include data identifying non-technical variables associated with the target process, such as data identifying in scope process areas of the target process, automation goals of the target process automation (e.g., effort reduction associated with the target process automation, turnaround time reduction associated with the target process automation, total cost of ownership associated with the target process automation, and/or the like), automation parameters of the target process automation (e.g., headcount within scope (e.g., within a threshold headcount) for the target process automation, timeline within scope (e.g., within a threshold time period) for the target process automation, and/or the like), automation levers for the target process automation (e.g., steps to be performed to achieve the target process automation), a roadmap for the target process automation (e.g., a plan for implementing the target process automation), and/or the like. In some implementations, the input data may include data identifying technical variables associated with the target process, such as data identifying a system landscape associated with the target process automation, automation levers associated with the target process automation, a system roadmap associated with the target process automation, an automation roadmap associated with the target process automation, system integrations associated with the target process automation, automation implementation complexity associated with the target process automation, and/or the like.

As further shown in FIG. 1A, and by reference number 110, the recommendation system may receive historical data identifying prior implementations and assets associated with the target process. For example, the recommendation system may be associated with a data structure (e.g., a database, a table, a list, and/or the like) that stores the historical data. The recommendation may provide, to the data structure, a request for the historical data and may receive the historical data from the data structure based on the request. In some implementations, the historical data identifying the prior implementations associated with the target process may include data identifying fit-for-purpose scores associated with the prior implementations, effort reductions associated with the prior implementations, turnaround time reductions associated with the prior implementations, total costs of ownership associated with the prior implementations, and/or the like. In some implementations, the historical data identifying the assets (e.g., tools, products, and/or the like) associated with the target process may include data identifying internal and external applications associated with the prior implementations, hosting options associated with the prior implementations, integration adaptors associated with the prior implementations, implementation complexities associated with the prior implementations, and/or the like.

Figure 1B:
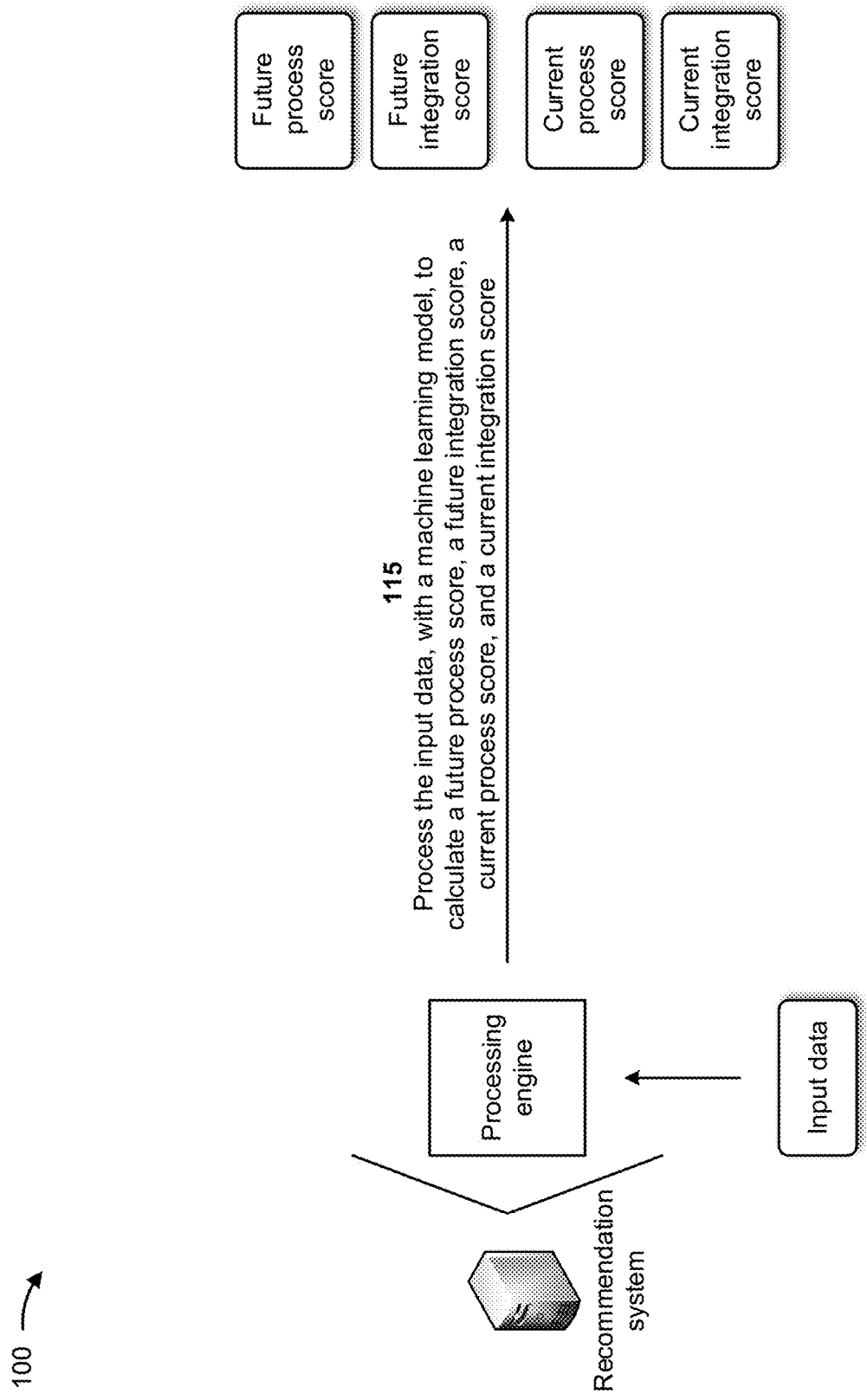

As shown in FIG. 1B, the recommendation system may include a processing engine that processes data received by the recommendation system and that calculates various parameters so that the recommendation system may determine a FFP rating for a target process automation. As further shown in FIG. 1B, and by reference number 115, the processing engine of the recommendation system may process the input data, with a machine learning model, to calculate a future process score, a future integration score, a current process score, and a current integration score. For example, the future process score may correspond to a score associated with a process of the target process, the future integration score may correspond to a score associated with integration of target assets (e.g., tools) with current assets (e.g., tools), the current process score may correspond to a score associated with one or more current processes (e.g., identified in the input data), and the current integration score may correspond to a score associated with integration of current tools.

In some implementations, when calculating the future process score, the recommendation system may multiply a first plurality of tool scores, associated with tools of the target process automation, by first normalized priority weights to generate a first plurality of weighted tool scores, and may aggregate the first plurality of weighted tool scores to generate the future process score. For example, $P_{future}$ may correspond to the future process score for a process with n categories, and $T_n$ may correspond a tool score for an nth category (e.g., of the first plurality of tool scores). $C=[c_1, \ldots, c_n]$ may correspond to a collection of the first normalized priority weights that may be determined and/or modified by the machine learning model on a per-project basis. The future process score may be calculated according to the following equation:

$$P_{future} = \sum_{i=1}^{n} T_n c_n.$$

In some implementations, when calculating the future integration score, the recommendation system may multiply the first plurality of tool scores by second normalized priority weights to generate a second plurality of weighted tool scores, and may aggregate the second plurality of weighted tool scores to generate the future integration score. For example, $I_{future}$ may correspond to the future integration score for a process with n categories, and $T_n$ may correspond a tool score for an nth category (e.g., of the first plurality of tool scores). $D=[d_1, \ldots, d_n]$ may correspond to a collection of the second normalized priority weights that may be determined and/or modified by the machine learning model on a per-project basis. The future integration score may be calculated according to the following equation:

$$I_{future} = \sum_{i=1}^{n} T_n d_n.$$

In some implementations, when calculating the current process score, the recommendation system may multiply a second plurality of tool scores, associated with tools of the prior implementations, by the first normalized priority weights to generate a third plurality of weighted tool scores, and may aggregate the third plurality of weighted tool scores to generate the current process score. For example, $P_{current}$ may correspond to the current process score for a process with n categories, and $T_n$ may correspond a tool score for an nth category (e.g., of the second plurality of tool scores). $C=[c_1, \ldots, c_n]$ may correspond to a collection of the first normalized priority weights that may be determined and/or modified by the machine learning model on a per-project basis. The current process score may be calculated according to the following equation:

$$P_{current} = \sum_{i=1}^{n} T_n c_n.$$

In some implementations, when calculating the current integration score, the recommendation system may multiply the second plurality of tool scores by the second normalized priority weights to generate a fourth plurality of weighted tool scores, and may aggregate the fourth plurality of weighted tool scores to generate the current integration score. For example, $I_{current}$ may correspond to the current integration score for a process with n categories, and $T_n$ may correspond a tool score for an nth category (e.g., of the second plurality of tool scores). $D=[d_1, \ldots, d_n]$ may correspond to a collection of the second normalized priority weights that may be determined and/or modified by the machine learning model on a per-project basis. The current integration score may be calculated according to the following equation:

$$I_{current} = \sum_{i=1}^{n} T_n d_n.$$

Further details of the machine learning model are provided below in connection with FIG. 2.

Figure 1C:
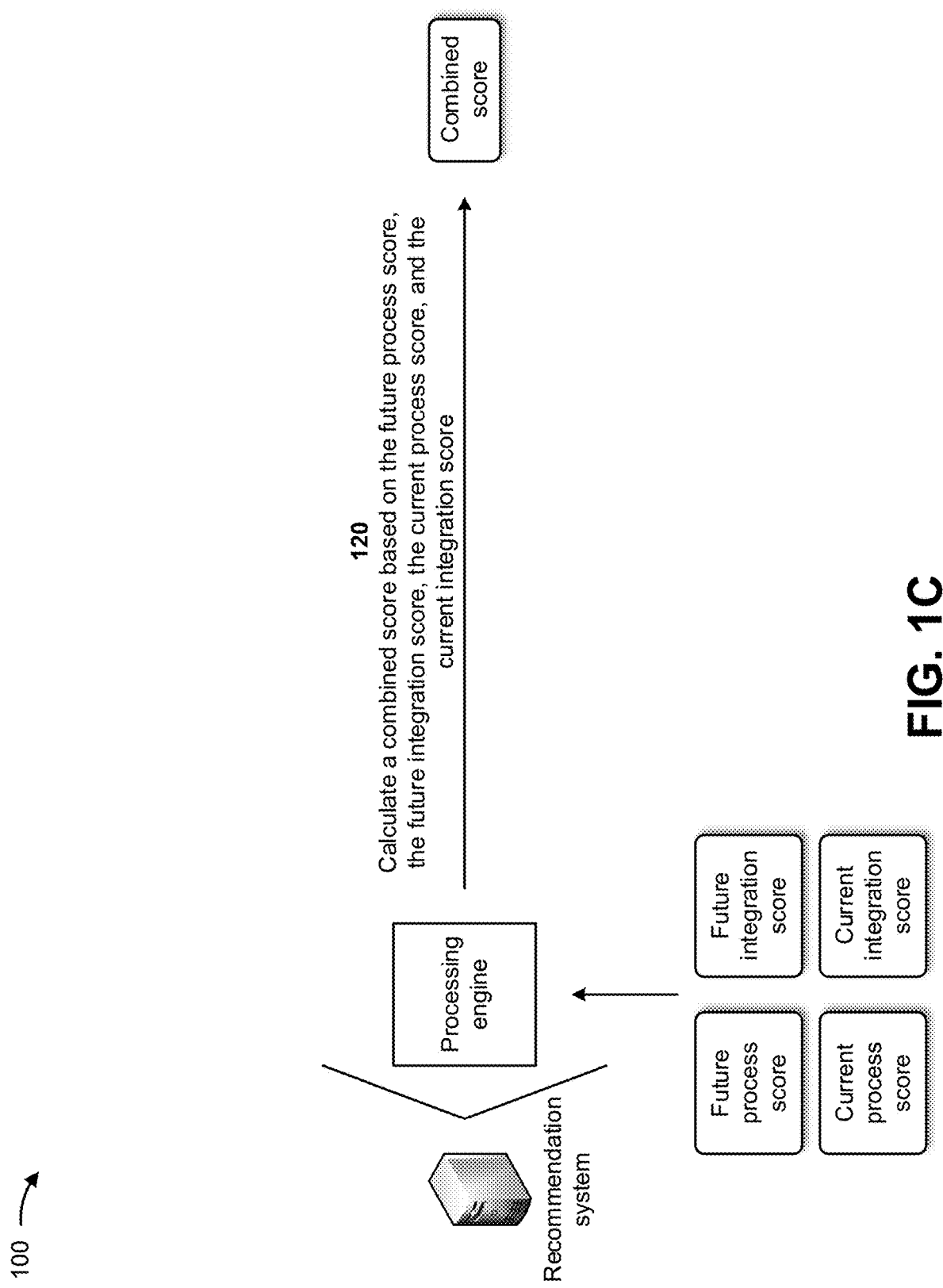

As shown in FIG. 1C, and by reference number 120, the processing engine of the recommendation system may calculate a combined score based on the future process score, the future integration score, the current process score, and the current integration score. For example, when calculating the combined score, the recommendation system may add the future process score and the future integration score to generate a first sum, and may add the current process score and the current integration score to generate a second sum. The recommendation system may subtract the second sum from the first sum to calculate the combined score. In some implementations, K may correspond to the combined score and may be calculated according to the following equation:

$$K = P_{future} + I_{future} (P_{current} + I_{current}).$$

Figure 1D:
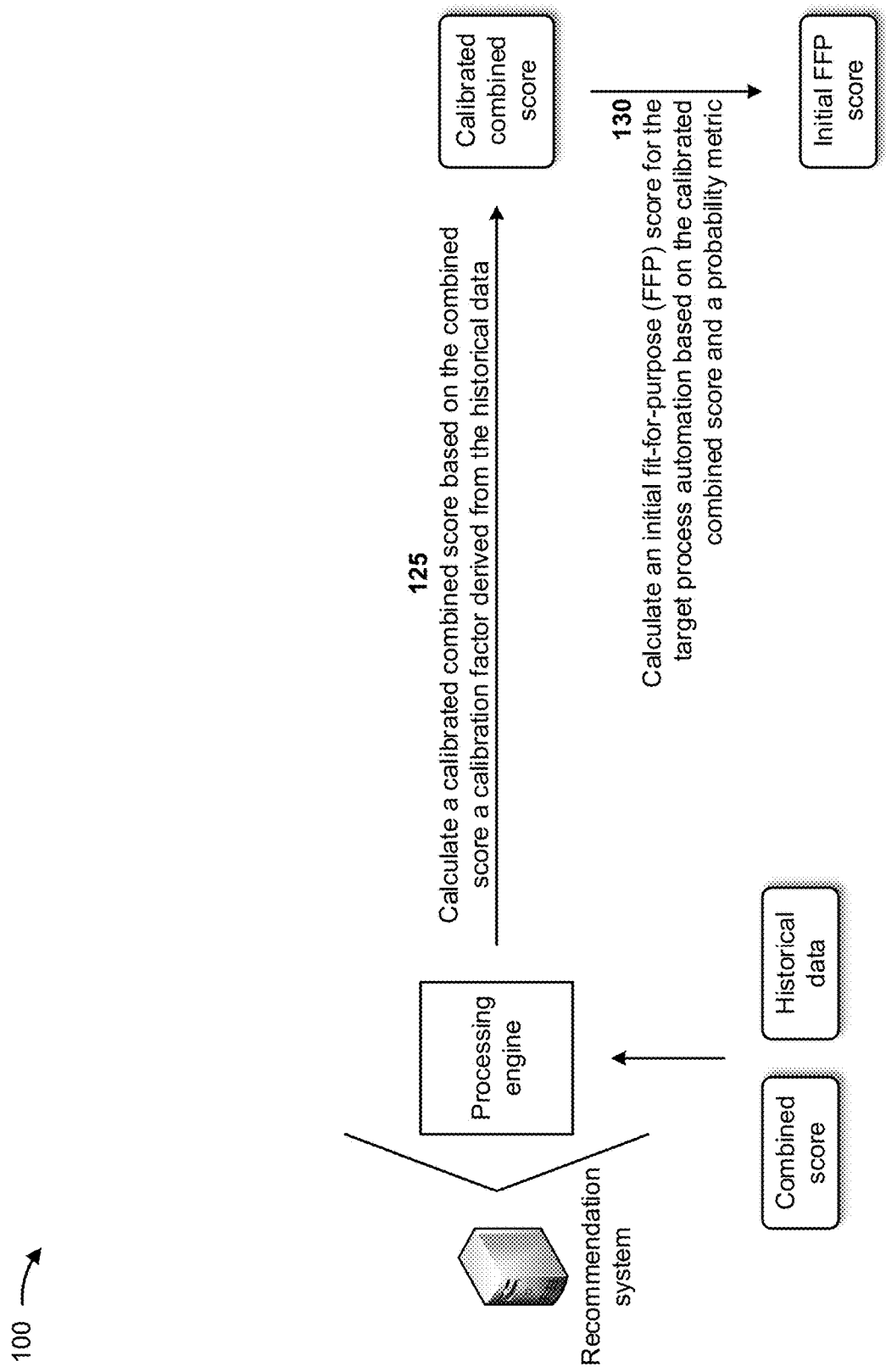

As shown in FIG. 1D, and by reference number 125, the processing engine of the recommendation system may calculate a calibrated combined score based on the combined score a calibration factor derived from the historical data. For example, when calculating the calibrated combined score, the recommendation system may divide the combined score by the calibration factor to calculate the calibrated combined score. In some implementations, G may correspond to the calibration factor derived from the historical data, and K* may correspond to the calibrated combined score. The calibrated combined score may be calculated according to the following equation:

$$K^* = K/G.$$

As further shown in FIG. 1D, and by reference number 130, the processing engine of the recommendation system may calculate an initial FFP score for the target process automation based on the calibrated combined score and a probability metric. For example, when calculating the initial FFP score for the target process automation based on the calibrated combined score and the probability metric, the recommendation system may divide the calibrated combined score by the probability metric to generate a value, and may scale the value, based on a scale, to calculate the initial FFP score for the target process automation. In some implementations, the recommendation system may define the probability metric ($K^*_{goal}$) independently by project. A probability Z that the calibrated combined score may reach the probability metric may be calculated according to the following equation:

$$Z=|K^*/K^*_{goal}|.$$

The recommendation system may scale the probability Z, based on a scale (e.g., from one to five), to generate the initial FFP score. The initial FFP score may be greater than zero when the combined score (K) is greater than zero. If the combined score (K) equals zero, or if one or more of the future process score, the future integration score, the current process score, and the current integration score are not well-defined, the probability (Z) and the initial FFP score may equal zero.

In some implementations, the scale may include a lowest value of one (1) and a highest value of five (5). An initial FFP score of five (5) may indicate that the target process automation has high probability of satisfying defined goals (e.g., the probability metric). An initial FFP score of three (3) may indicate that the target process automation has moderate probability of satisfying the defined goals and that recommendations provided by the recommendation system may increase the initial FFP score. An initial FFP score of one (1) may indicate that the target process automation has low probability of satisfying the defined goals. In such situations, the recommendation system may recommend to modify or completely change the target process automation. An initial FFP score of zero (0) may indicate that there is insufficient data to provide assessment of the target process automation. In some implementations, the scale may include different threshold values or threshold descriptions associated with the probability of the target process automation satisfying the probability metric.

Figure 1E:
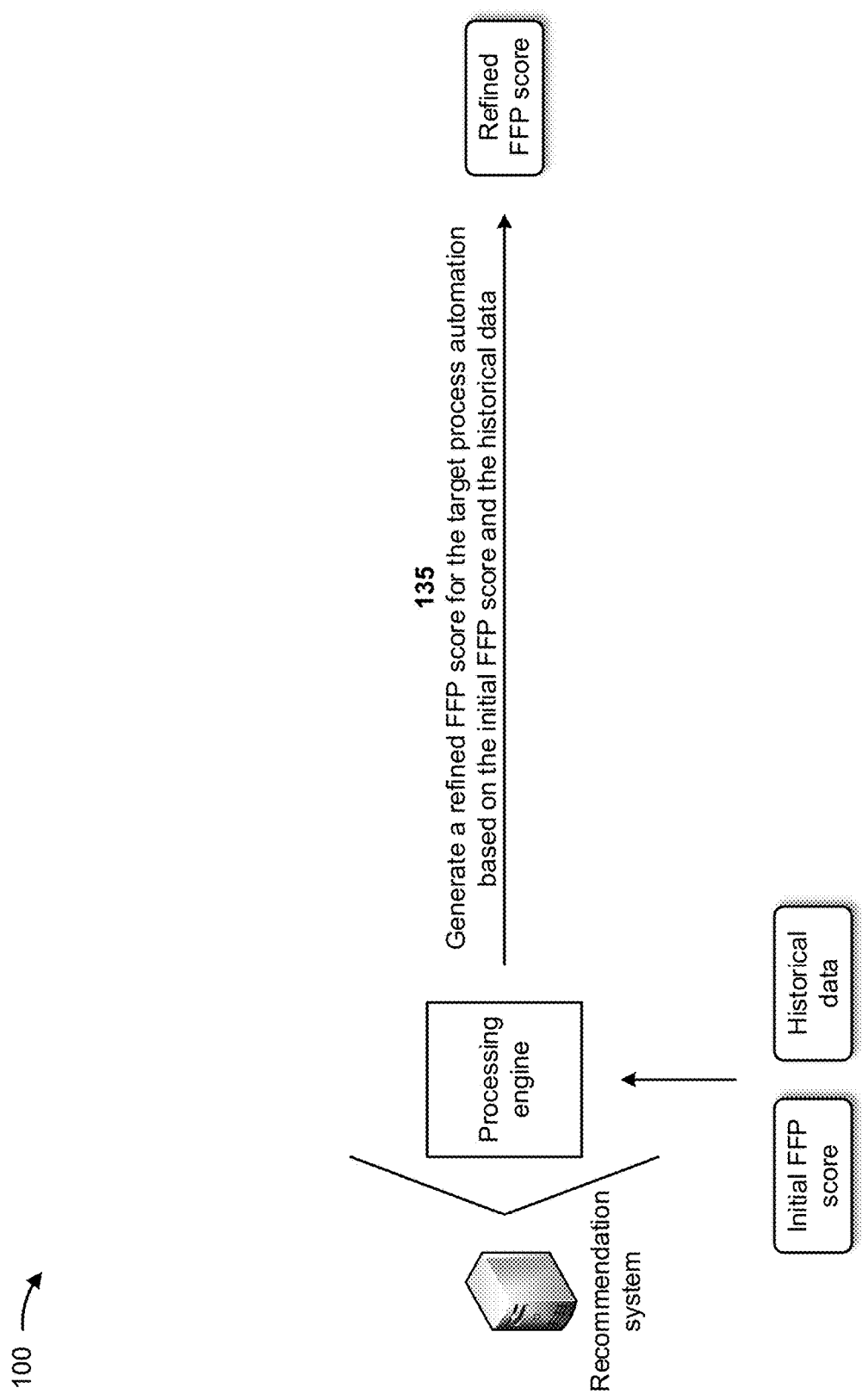

As shown in FIG. 1E, and by reference number 135, the processing engine of the recommendation system may generate a refined FFP score for the target process automation based on the initial FFP score and the historical data. For example, when generating the refined FFP score, the recommendation system may identify one or more of the prior implementations that substantially match the target process automation, and may identify, from the historical data, one or more historical FFP scores associated with the one or more of the prior implementations. The recommendation system may identify, from the historical data, historical time, effort, and results associated with the one or more of the prior implementations, and may generate the refined FFP score based on the initial fit-for-purpose score, the one or more historical FFP scores and the historical time, effort, and results.

Figure 1F:
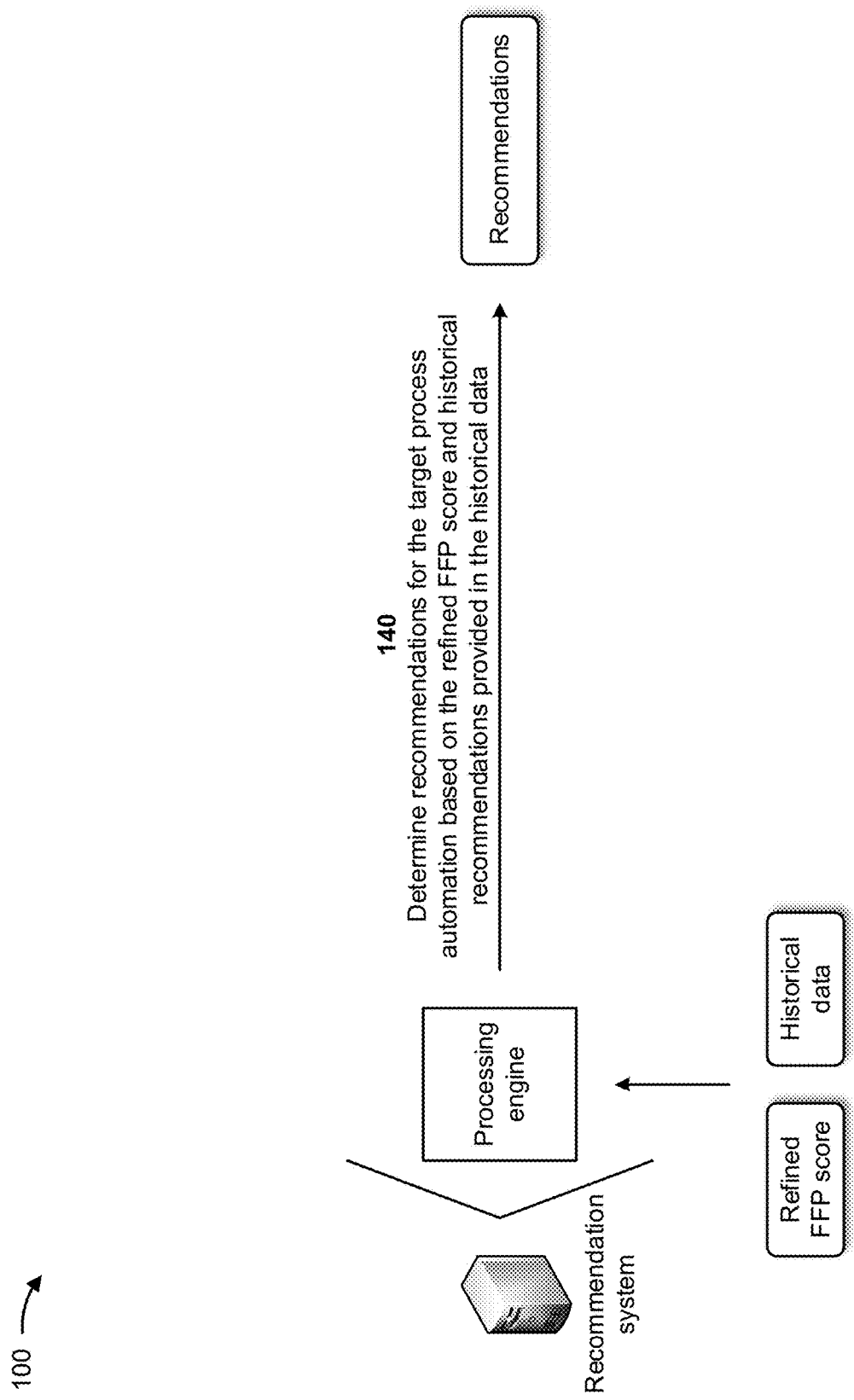

As shown in FIG. 1F, and by reference number 140, the processing engine of the recommendation system may determine recommendations for the target process automation based on the refined FFP score and historical recommendations provided in the historical data. For example, when determining the recommendations for the target process automation, the recommendation system may identify a set of the historical recommendations associated with the prior implementations that substantially match the target process automation, and ma determine the recommendations for the target process automation based on the set of the historical recommendations. In some implementations, the historical recommendations associated with prior implementations may be stored in a recommendation and best practice data structure associated with the recommendation system.

In some implementations, the recommendations include one or more of a recommendation to adapt tools for the target process automation, a recommendation to review process gaps in the target process automation, a recommendation to upgrade functions of available tools for the target process automation, a recommendation to utilize existing tools for the target process automation, a recommendation to execute an instruction to automatically implement the target process automation (e.g., automatically perform appropriate upgrades, reconfigurations, or similar functions), and/or the like.

Figure 1G:
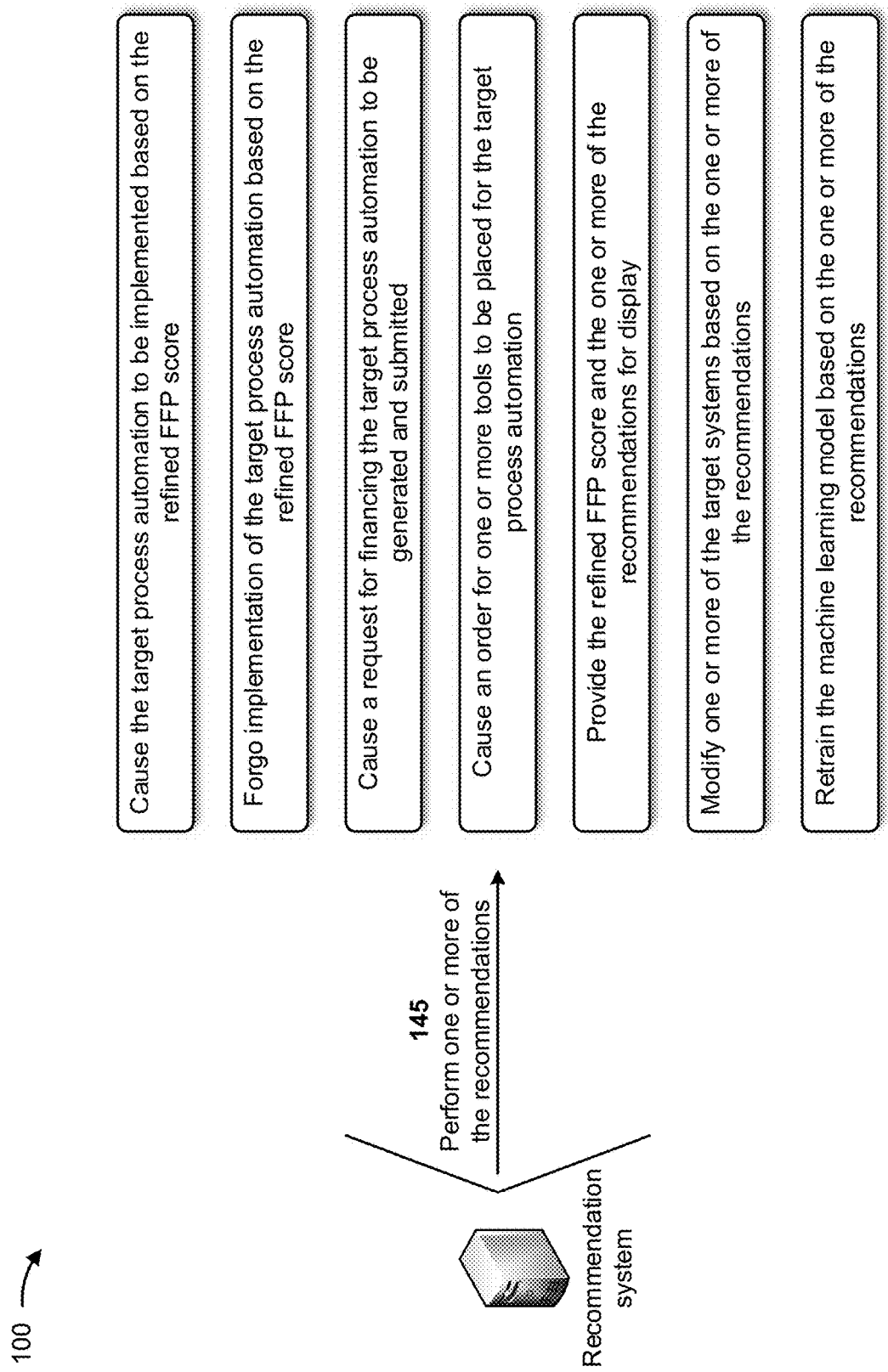

As shown in FIG. 1G, and by reference number 145, the recommendation system may perform one or more of the recommendations. In some implementations, performing the one or more of the recommendations includes the recommendation system causing the target process automation to be implemented based on the refined FFP score. For example, the recommendation system may provide configuration information for the target process automation to one of the target systems and may instruct the target system to implement the target process automation based on the configuration information. In this way, the recommendation system may conserve computing resources, networking resources, and/or the like that would otherwise have been consumed in generating an erroneous automation, identifying errors in the erroneous automation, correcting the erroneous automation, configuring and purchasing tools for the erroneous automation, and/or the like.

In some implementations, performing the one or more of the recommendations includes the recommendation system forgoing implementation of the target process automation based on the refined FFP score. For example, based on the refined FFP score, the recommendation system may determine the target process automation will be unsuccessful. Accordingly, the recommendation system may not instruct one or more of the target systems to implement the target process automation. In this way, the recommendation system may conserve computing resources, networking resources, and/or the like that would otherwise have been consumed in generating an erroneous automation, configuring and purchasing tools for the erroneous automation, and/or the like.

In some implementations, performing the one or more of the recommendations includes the recommendation system causing a request for financing the target process automation to be generated and submitted. For example, the recommendation system may determine that one or more new assets need to purchased for the target process automation, and may generate request for financing the purchase of the one or more new assets. The recommendation system may provide the request for financing to a financial department and/or financial institution. In this way, the recommendation system may conserve computing resources, networking resources, and/or the like that would otherwise have been consumed in generating an erroneous automation, correcting the erroneous automation, configuring and purchasing unnecessary tools for the erroneous automation, and/or the like.

In some implementations, performing the one or more of the recommendations includes the recommendation system causing an order for one or more tools to be placed for the target process automation. For example, the recommendation system may determine that one or more tools need to be purchased for the target process automation, and may cause an order for the one or more tools to be generated and placed with one or more tool manufacturers. In this way, the recommendation system may conserve computing resources, networking resources, and/or the like that would otherwise have been consumed in identifying errors in an erroneous automation, correcting the erroneous automation, and/or the like.

In some implementations, performing the one or more of the recommendations includes the recommendation system providing the refined FFP score and the one or more of the recommendations for display. For example, the recommendation system may provide the refined FFP score and the one or more of the recommendations, for display, to an operator of one of the target systems (e.g., via the target system). The operator may review the FFP score and the one or more recommendations, and may or may not cause the target process automation to be implemented based on the FFP score and/or the one or more recommendations. In this way, the recommendation system may conserve computing resources, networking resources, and/or the like that would otherwise have been consumed in generating an erroneous automation, configuring and purchasing tools for the erroneous automation, and/or the like.

In some implementations, performing the one or more of the recommendations includes the recommendation system modifying one or more of the target systems based on the one or more of the recommendations. For example, the recommendation system may determine that one or more of the target systems need to be modified for the target process automation to be successful. The recommendation system may modify the one or more of the target systems (e.g., by reconfiguring the target systems, adding software to the target systems, and/or the like) so that the target process automation may be successful. In this way, the recommendation system may conserve computing resources, networking resources, and/or the like that would otherwise have been consumed in generating an unsuccessful automation, identifying errors in the unsuccessful automation, correcting the unsuccessful automation, configuring and purchasing tools for the unsuccessful automation, and/or the like.

In some implementations, performing the one or more of the recommendations includes the recommendation system retraining the machine learning model based on the one or more of the recommendations. For example, the recommendation system may utilize the one or more of the recommendations as additional training data for retraining the machine learning model, thereby increasing the quantity of training data available for training the machine learning model. Accordingly, the recommendation system may conserve computing resources associated with identifying, obtaining, and/or generating historical data for training the machine learning model relative to other systems for identifying, obtaining, and/or generating historical data for training machine learning models.

In this way, the recommendation system determines a FFP rating for a target process automation. The recommendation system may process multiple variables (e.g., available automation levers in an automation landscape), and may determine an integrability of the automation levers. The recommendation system may determine an applicability of each automation lever to automate a target process in order to quantify FFP automation. The recommendation may calculate a FFP score for the target process automation and may utilize the FFP score to provide and/or implement recommendations with respect to the target process automation. This, in turn, conserves computing resources, networking resources, and/or the like that would otherwise have been consumed in generating an erroneous automation, identifying errors in the erroneous automation, correcting the erroneous automation, configuring and purchasing tools for the erroneous automation, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
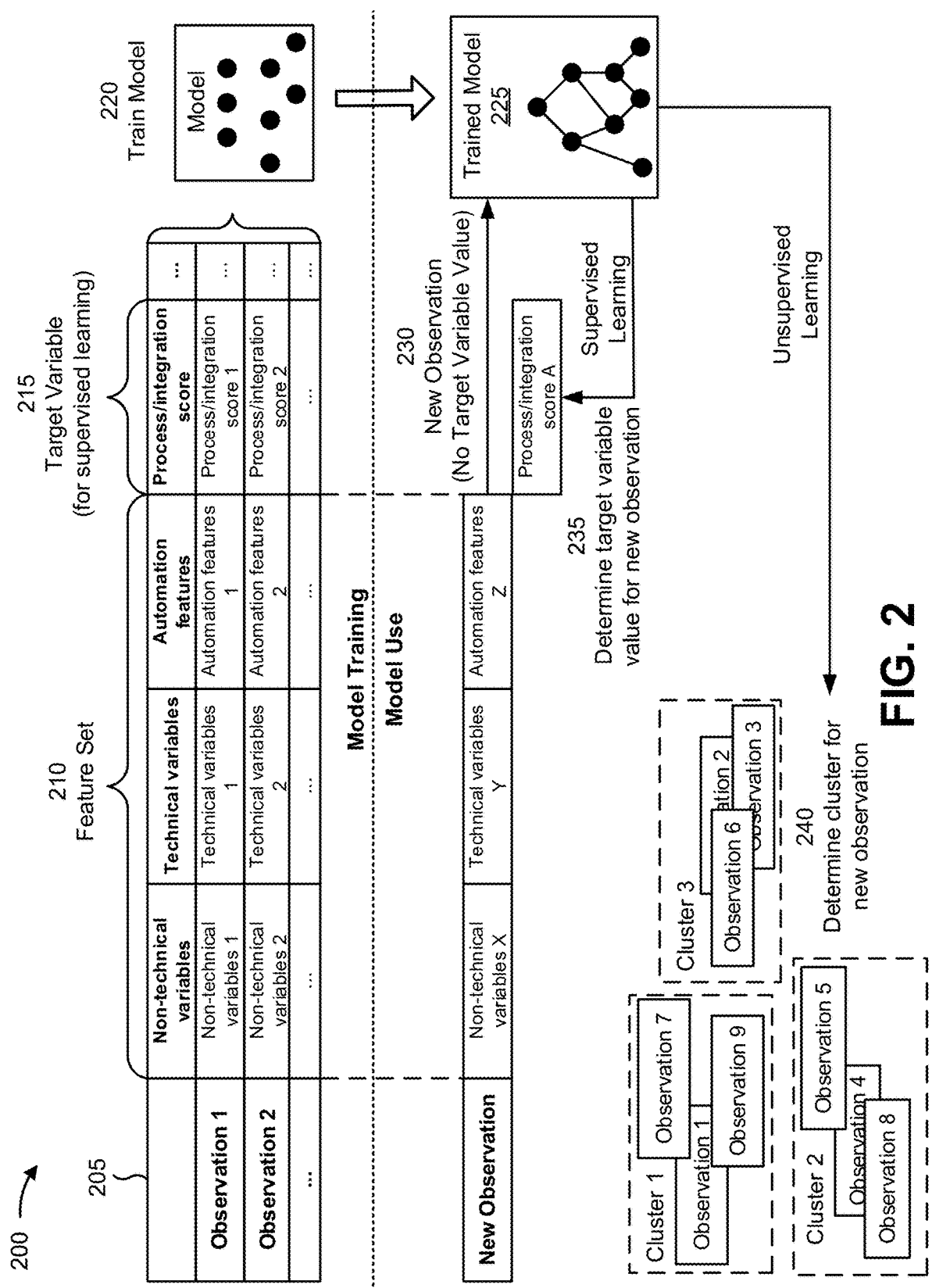
FIG. 2 is a diagram illustrating an example of training and using a machine learning model in connection with determining a fit-for-purpose rating for a target process automation.

FIG. 2 is a diagram illustrating an example 200 of training and using a machine learning model in connection with determining a FFP rating for a target process automation. The machine learning model training and usage described herein may be performed using a machine learning system. The machine learning system may include or may be included in a computing device, a server, a cloud computing environment, and/or the like, such as the recommendation system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the recommendation system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the recommendation system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of non-technical variables, a second feature of technical variables, a third feature of automation features, and so on. As shown, for a first observation, the first feature may have a value of non-technical variables 1, the second feature may have a value of technical variables 1, the third feature may have a value of automation features 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a process/integration score, which has a value of process/integration score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of non-technical variables X, a second feature of technical variables Y, a third feature of automation features Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of process/integration score A for the target variable of the process/integration score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a non-technical variables cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a technical variables cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine a FFP rating for a target process automation. The machine learning system enables recognition and/or identification of tens, hundreds, thousands, or millions of features and/or feature values for tens, hundreds, thousands, or millions of observations, thereby increasing accuracy and consistency and reducing delay associated with determining a FFP rating for a target process automation relative to requiring computing resources to be allocated for tens, hundreds, or thousands of operators to manually determine a FFP rating for a target process automation.

As indicated above, FIG. 2 is provided as an example. Other examples may differ from what is described in connection with FIG. 2.

Figure 3:
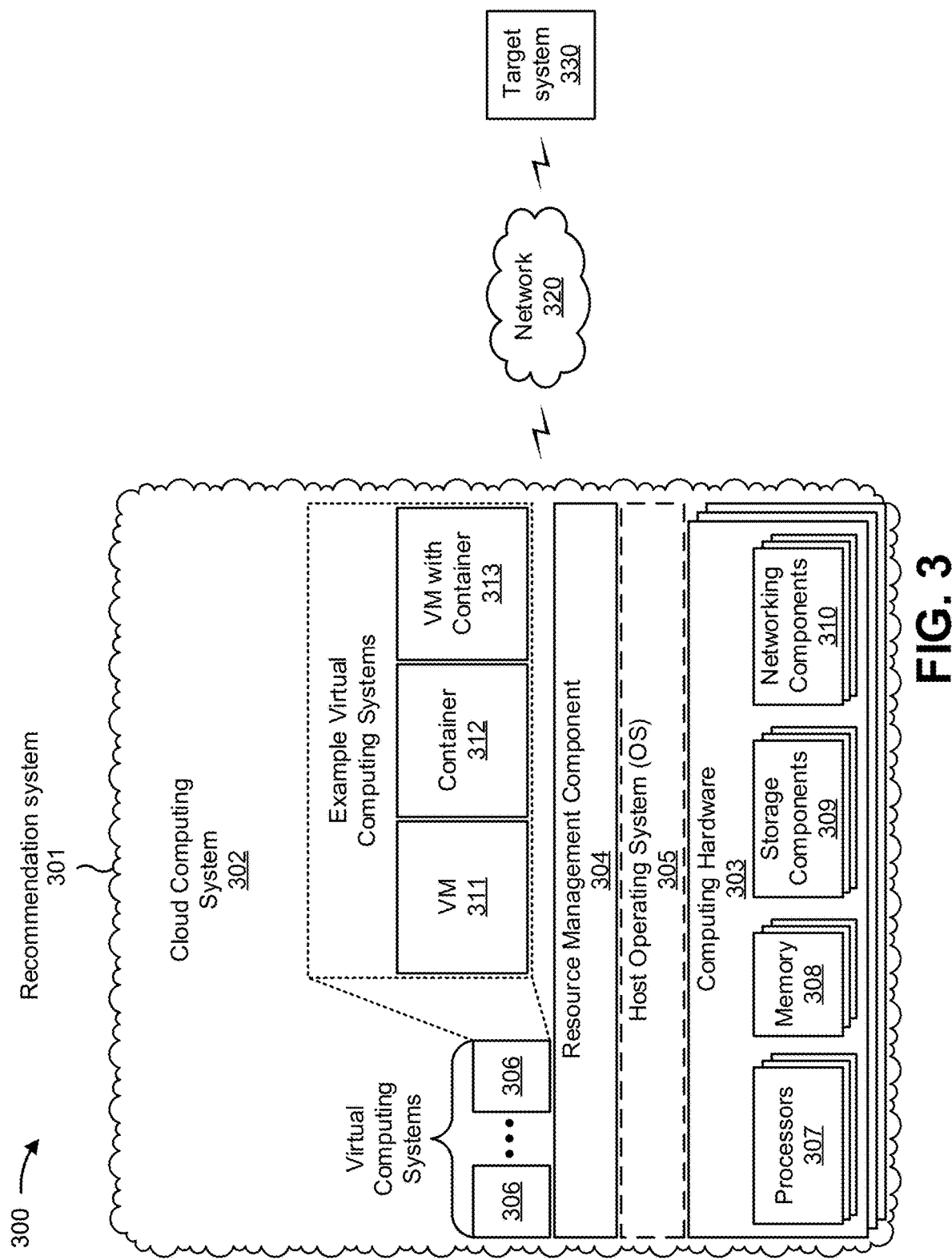
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a recommendation system 301, which may include one or more elements of and/or may execute within a cloud computing system 302. The cloud computing system 302 may include one or more elements 303-313, as described in more detail below. As further shown in FIG. 3, the environment 300 may include a network 320 and/or a target system 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the recommendation system 301 may include one or more elements 303-313 of the cloud computing system 302, may execute within the cloud computing system 302, and/or may be hosted within the cloud computing system 302, in some implementations, the recommendation system 301 may not be cloud-based (e.g., may be implemented outside of a cloud computing system) or may be partially cloud-based. For example, the recommendation system 301 may include one or more devices that are not part of the cloud computing system 302, such as device 400 of FIG. 4, which may include a standalone server or another type of computing device. The recommendation system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The target system 330 includes one or more devices capable of receiving, generating, storing, processing, providing, and/or routing information, as described elsewhere herein. The target system 330 may include a communication device and/or a computing device. For example, the target system 330 may include a server, such as an application server, a client server, a web server, a database server, a host server, a proxy server, a virtual server (e.g., executing on computing hardware), or a server in a cloud computing system. In some implementations, the target system 330 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
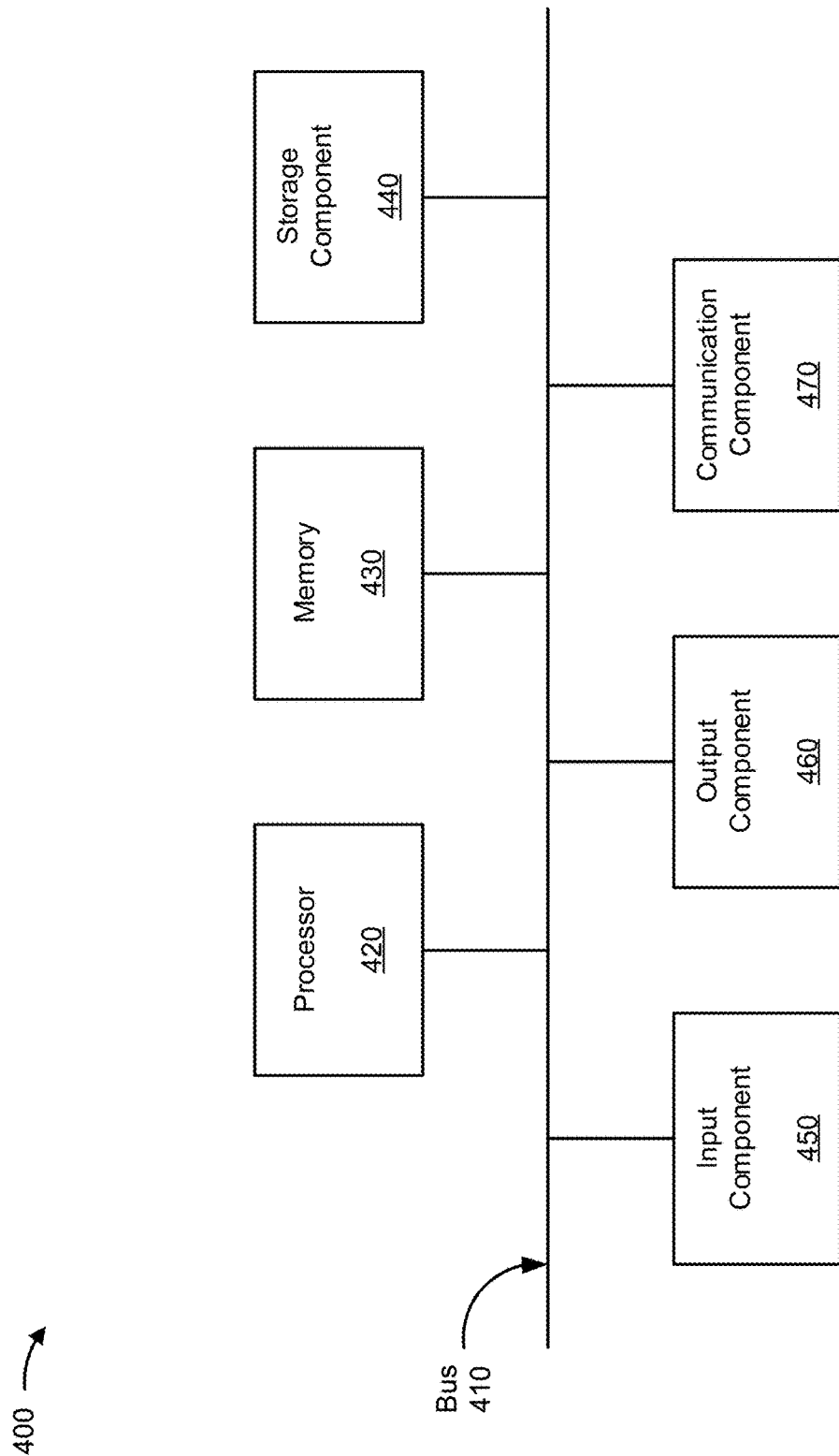
FIG. 4 is a diagram of example components of one or more devices of FIG. 3.

FIG. 4 is a diagram of example components of a device 400, which may correspond to the recommendation system 301 and/or the target system 330. In some implementations, the recommendation system 301 and/or the target system 330 may include one or more devices 400 and/or one or more components of the device 400. As shown in FIG. 4, the device 400 may include a bus 410, a processor 420, a memory 430, a storage component 440, an input component 450, an output component 460, and a communication component 470.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The storage component 440 stores information and/or software related to the operation of the device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables the device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, an actuator, and/or the like. The output component 460 enables the device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, an antenna, and/or the like.

The device 400 may perform one or more processes described herein. For example, a non-transitory computer-readable medium (e.g., the memory 430 and/or the storage component 440) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
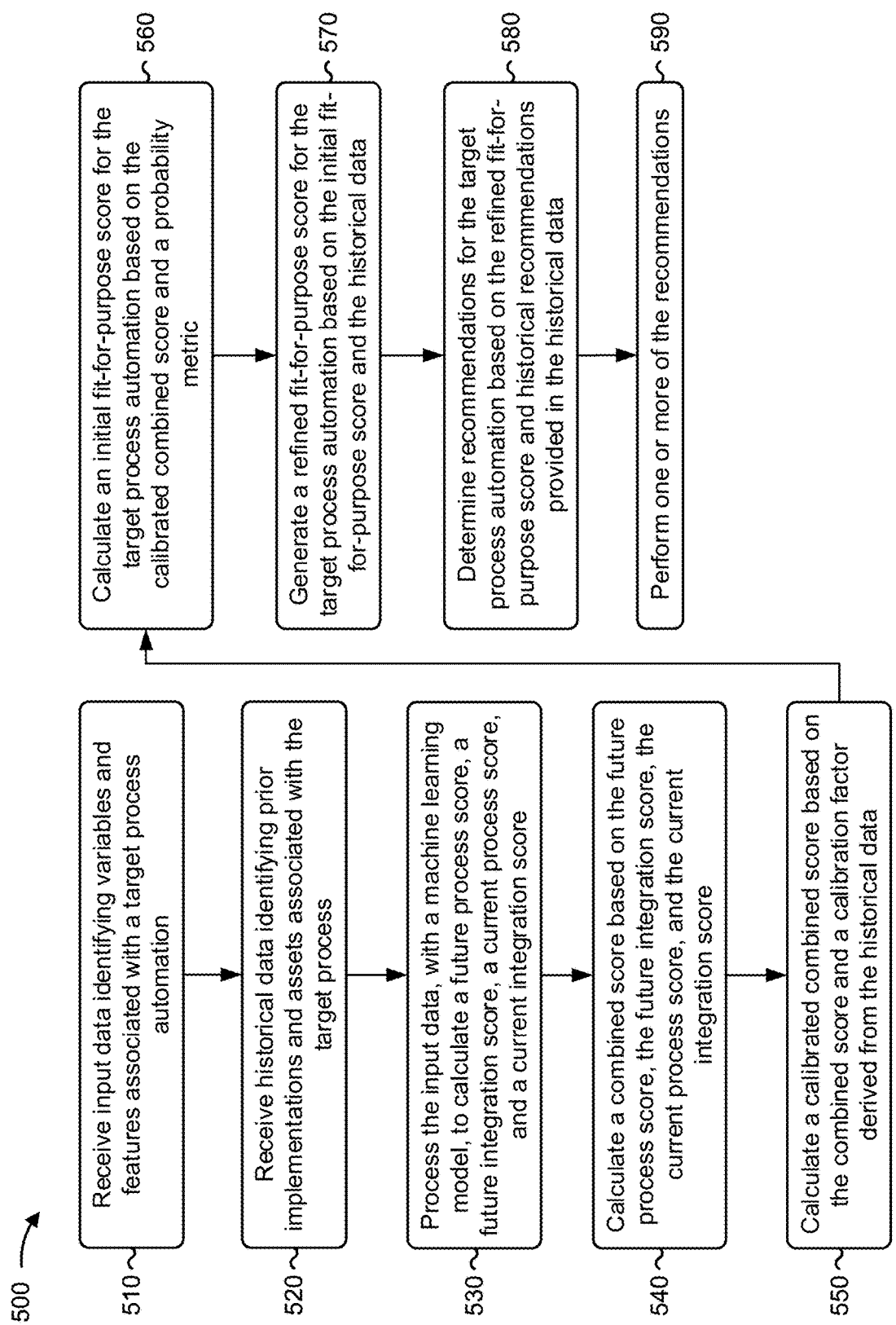
FIG. 5 is a flowchart of an example process for determining a fit-for-purpose rating for a target process automation.

FIG. 5 is a flowchart of an example process 500 for determining a FFP rating for a target process automation. In some implementations, one or more process blocks of FIG. 5 may be performed by a device (e.g., the recommendation system 301). In some implementations, one or more process blocks of FIG. 5 may be performed by another device or a group of devices separate from or including the device, such as a target system (e.g., the target system 330). Additionally, or alternatively, one or more process blocks of FIG. 5 may be performed by one or more components of the device 400, such as the processor 420, the memory 430, the storage component 440, the input component 450, the output component 460, and/or the communication component 470.

As shown in FIG. 5, process 500 may include receiving input data identifying variables and features associated with a target process automation (block 510). For example, the device may receive input data identifying variables and features associated with a target process automation, as described above. In some implementations, the input data includes data identifying one or more of in scope process areas of the target process, effort reduction associated with the target process automation, turnaround time reduction associated with the target process automation, total cost of ownership associated with the target process automation, within scope for the target process automation, within scope for the target process automation, a system landscape associated with the target process automation, automation levers associated with the target process automation, a system roadmap associated with the target process automation, an automation roadmap associated with the target process automation, integrations associated with the target process automation, or automation implementation complexity associated with the target process automation.

As further shown in FIG. 5, process 500 may include receiving historical data identifying prior implementations and assets associated with the target process (block 520). For example, the device may receive historical data identifying prior implementations and assets associated with the target process, as described above. In some implementations, the historical data includes data identifying one or more of a fit-for-purpose score associated with one of the prior implementations, effort reduction associated with one of the prior implementations, turnaround time reduction associated with one of the prior implementations, total cost of ownership associated with one of the prior implementations, internal and external applications associated with one of the prior implementations, hosting options associated with one of the prior implementations, integration adaptors associated with one of the prior implementations, or complexity associated with one of the prior implementations.

As further shown in FIG. 5, process 500 may include processing the input data, with a machine learning model, to calculate a future process score, a future integration score, a current process score, and a current integration score (block 530). For example, the device may process the input data, with a machine learning model, to calculate a future process score, a future integration score, a current process score, and a current integration score, as described above. In some implementations, processing the input data, with the machine learning model, to calculate the future process score, the future integration score, the current process score, and the current integration score includes multiplying a first plurality of tool scores, associated with tools of the target process automation, by first normalized priority weights to generate a first plurality of weighted tool scores; aggregating the first plurality of weighted tool scores to generate the future process score; multiplying the first plurality of tool scores by second normalized priority weights to generate a second plurality of weighted tool scores; aggregating the second plurality of weighted tool scores to generate the future integration score; multiplying a second plurality of tool scores, associated with tools of the prior implementations, by the first normalized priority weights to generate a third plurality of weighted tool scores; aggregating the third plurality of weighted tool scores to generate the current process score; multiplying the second plurality of tool scores by the second normalized priority weights to generate a fourth plurality of weighted tool scores; and aggregating the fourth plurality of weighted tool scores to generate the current integration score.

As further shown in FIG. 5, process 500 may include calculating a combined score based on the future process score, the future integration score, the current process score, and the current integration score (block 540). For example, the device may calculate a combined score based on the future process score, the future integration score, the current process score, and the current integration score, as described above. In some implementations, calculating the combined score based on the future process score, the future integration score, the current process score, and the current integration score includes adding the future process score and the future integration score to generate a first sum, adding the current process score and the current integration score to generate a second sum, and subtracting the second sum from the first sum to calculate the combined score.

As further shown in FIG. 5, process 500 may include calculating a calibrated combined score based on the combined score and a calibration factor derived from the historical data (block 550). For example, the device may calculate a calibrated combined score based on the combined score and a calibration factor derived from the historical data, as described above. In some implementations, calculating the calibrated combined score based on the combined score and the calibration factor derived from the historical data includes dividing the combined score by the calibration factor to calculate the calibrated combined score.

As further shown in FIG. 5, process 500 may include calculating an initial fit-for-purpose score for the target process automation based on the calibrated combined score and a probability metric (block 560). For example, the device may calculate an initial fit-for-purpose score for the target process automation based on the calibrated combined score and a probability metric, as described above. In some implementations, calculating the initial fit-for-purpose score for the target process automation based on the calibrated combined score and the probability metric includes dividing the calibrated combined score by the probability metric to generate a value, and scaling the value, based on a scale, to calculate the initial fit-for-purpose score for the target process automation.

As further shown in FIG. 5, process 500 may include generating a refined fit-for-purpose score for the target process automation based on the initial fit-for-purpose score and the historical data (block 570). For example, the device may generate a refined fit-for-purpose score for the target process automation based on the initial fit-for-purpose score and the historical data, as described above. In some implementations, the refined fit-for-purpose score is scaled based on a scale of a first value and a second value, wherein the first value provides an indication that the target process automation satisfies thresholds associated with the target process automation, and wherein the second value provides an indication that the target process automation fails to satisfy the thresholds associated with the target process automation.

In some implementations, generating the refined fit-for-purpose score for the target process automation based on the initial fit-for-purpose score and the historical data includes identifying one or more of the prior implementations that substantially match the target process automation; identifying one or more historical fit-for-purpose scores associated with the one or more of the prior implementations; identifying historical time, effort, and results associated with the one or more of the prior implementations; and generating the refined fit-for-purpose score based on the initial fit-for-purpose score, the one or more historical fit-for-purpose scores, and the historical time, effort, and results.

As further shown in FIG. 5, process 500 may include determining recommendations for the target process automation based on the refined fit-for-purpose score and historical recommendations provided in the historical data (block 580). For example, the device may determine recommendations for the target process automation based on the refined fit-for-purpose score and historical recommendations provided in the historical data, as described above. In some implementations, determining the recommendations for the target process automation based on the refined fit-for-purpose score and historical recommendations provided in the historical data includes identifying a set of the historical recommendations associated with the prior implementations that substantially match the target process automation, and determining the recommendations for the target process automation based on the set of the historical recommendations.

In some implementations, the recommendations include one or more of a recommendation to adapt tools for the target process automation, a recommendation to review process gaps in the target process automation, a recommendation to upgrade functions of available tools for the target process automation, or a recommendation to utilize existing tools for the target process automation.

As further shown in FIG. 5, process 500 may include performing one or more of the recommendations (block 590). For example, the device may perform one or more of the recommendations, as described above. In some implementations, performing the one or more of the recommendations includes one or more of causing the target process automation to be implemented based on the refined fit-for-purpose score, forgoing implementation of the target process automation based on the refined fit-for-purpose score, or causing a request for financing the target process automation to be generated and submitted. In some implementations, performing the one or more of the recommendations includes one or more of causing an order for one or more tools to be placed for the target process automation, providing the refined fit-for-purpose score and the one or more of the recommendations for display, or retraining the machine learning model based on the one or more of the recommendations.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, input data identifying variables and features associated with a target process automation;
receiving, by the device, historical data identifying prior implementations and assets associated with the target process;
processing, by the device, the input data, with a machine learning model, to calculate a future process score, a future integration score, a current process score, and a current integration score, wherein the future process score corresponds to a score associated with a process of the target process automation, the future integration score corresponds to a score associated with integration of tools of the target process automation with tools of one or more current processes identified in the input data, the current process score corresponds to a score associated with the one or more current processes, and the current integration score corresponds to a score associated with integration of the tools of the one or more current processes, wherein processing the input data, with the machine learning model, to calculate the future process score, the future integration score, the current process score, and the current integration score comprises:
multiplying a first plurality of tool scores, associated with the tools of the target process automation, by first normalized priority weights to generate a first plurality of weighted tool scores;
aggregating the first plurality of weighted tool scores to generate the future process score;
multiplying the first plurality of tool scores by second normalized priority weights to generate a second plurality of weighted tool scores;
aggregating the second plurality of weighted tool scores to generate the future integration score;
multiplying a second plurality of tool scores, associated with tools of the prior implementations, by the first normalized priority weights to generate a third plurality of weighted tool scores;
aggregating the third plurality of weighted tool scores to generate the current process score;
multiplying the second plurality of tool scores by the second normalized priority weights to generate a fourth plurality of weighted tool scores; and
aggregating the fourth plurality of weighted tool scores to generate the current integration score;
calculating, by the device, a combined score based on the future process score, the future integration score, the current process score, and the current integration score;
calculating, by the device, a calibrated combined score based on the combined score and a calibration factor derived from the historical data;
calculating, by the device, an initial fit-for-purpose score for the target process automation based on the calibrated combined score and a probability metric;
generating, by the device, a refined fit-for-purpose score for the target process automation based on the initial fit-for-purpose score and the historical data;
determining, by the device, recommendations for the target process automation based on the refined fit-for-purpose score and historical recommendations provided in the historical data;
performing, automatically by the device, one or more of the recommendations, wherein automatically performing the one or more of the recommendations comprises:
providing the refined fit-for-purpose score and the one or more of the recommendations for display; and
retraining the machine learning model based on the one or more of the recommendations and the refined fit-for-purpose score, as a feedback to the machine learning model; and
automatically implementing changes to hardware and/or software of a target system to achieve the target process automation based on the one or more recommendations.

2. The method of claim 1, wherein the input data includes data identifying one or more of:
in scope process areas of the target process,
effort reduction associated with the target process automation,
turnaround time reduction associated with the target process automation,
total cost of ownership associated with the target process automation,
headcount within scope for the target process automation,
timeline within scope for the target process automation,
a system landscape associated with the target process automation,
automation levers associated with the target process automation,
a system roadmap associated with the target process automation,
an automation roadmap associated with the target process automation,
system integrations associated with the target process automation, or
automation implementation complexity associated with the target process automation.

3. The method of claim 1, wherein the historical data includes data identifying one or more of:
a fit-for-purpose score associated with one of the prior implementations,
effort reduction associated with one of the prior implementations,
turnaround time reduction associated with one of the prior implementations,
total cost of ownership associated with one of the prior implementations,
internal and external applications associated with one of the prior implementations,
hosting options associated with one of the prior implementations,
integration adaptors associated with one of the prior implementations, or
implementation complexity associated with one of the prior implementations.

4. The method of claim 1, wherein the refined fit-for-purpose score is scaled based on a scale of a first value and a second value,
   wherein the first value provides an indication that the target process automation satisfies thresholds associated with the target process automation,
   wherein the second value provides an indication that the target process automation fails to satisfy the thresholds associated with the target process automation.

5. The method of claim 1, wherein calculating the combined score based on the future process score, the future integration score, the current process score, and the current integration score comprises:
   adding the future process score and the future integration score to generate a first sum;
   adding the current process score and the current integration score to generate a second sum; and
   subtracting the second sum from the first sum to calculate the combined score.

6. The method of claim 1, wherein calculating the calibrated combined score based on the combined score and the calibration factor derived from the historical data comprises:
   dividing the combined score by the calibration factor to calculate the calibrated combined score.

7. A device, comprising:
   one or more memories; and
   one or more processors, coupled to the one or more memories, configured to:
      receive input data identifying variables and features associated with a target process automation;
      receive historical data identifying prior implementations and assets associated with the target process;
      process the input data, with a machine learning model, to calculate a future process score, a future integration score, a current process score, and a current integration score, wherein the future process score corresponds to a score associated with a process of the target process automation, the future integration score corresponds to a score associated with integration of tools of the target process automation with tools of one or more current processes identified in the input data, the current process score corresponds to a score associated with the one or more current processes, and the current integration score corresponds to a score associated with integration of the tools of the one or more current processes, wherein processing the input data, with the machine learning model, to calculate the future process score, the future integration score, the current process score, and the current integration score comprises:
         multiplying a first plurality of tool scores, associated with the tools of the target process automation, by first normalized priority weights to generate a first plurality of weighted tool scores;
         aggregating the first plurality of weighted tool scores to generate the future process score;
         multiplying the first plurality of tool scores by second normalized priority weights to generate a second plurality of weighted tool scores;
         aggregating the second plurality of weighted tool scores to generate the future integration score;
         multiplying a second plurality of tool scores, associated with tools of the prior implementations, by the first normalized priority weights to generate a third plurality of weighted tool scores;
         aggregating the third plurality of weighted tool scores to generate the current process score;
         multiplying the second plurality of tool scores by the second normalized priority weights to generate a fourth plurality of weighted tool scores; and
         aggregating the fourth plurality of weighted tool scores to generate the current integration score;
      calculate a combined score based on the future process score, the future integration score, the current process score, and the current integration score;
      calculate a calibrated combined score based on the combined score and a calibration factor derived from the historical data;
      calculate an initial fit-for-purpose score for the target process automation based on the calibrated combined score and a probability metric;
      generate a refined fit-for-purpose score for the target process automation based on the initial fit-for-purpose score and the historical data,
         wherein the refined fit-for-purpose score is scaled based on a scale of a first value and a second value,
         wherein the first value provides an indication that the target process automation satisfies thresholds associated with the target process automation,
         wherein the second value provides an indication that the target process automation fails to satisfy the thresholds associated with the target process automation;
      determine recommendations for the target process automation based on the refined fit-for-purpose score and historical recommendations provided in the historical data;
      automatically perform one or more of the recommendations, wherein automatically performing the one or more of the recommendations comprises:
         providing the refined fit-for-purpose score and the one or more of the recommendations for display; and
         retraining the machine learning model based on the one or more of the recommendations and the refined fit-for-purpose score, as a feedback to the machine learning model; and
      automatically implement changes to hardware and/or software of a target system to achieve the target process automation based on the one or more recommendations.

8. The device of claim 7, wherein the one or more processors, to calculate the initial fit-for-purpose score for the target process automation based on the calibrated combined score and the probability metric, are configured to:
   divide the calibrated combined score by the probability metric to generate a value; and
   scale the value, based on a scale, to calculate the initial fit-for-purpose score for the target process automation.

9. The device of claim 7, wherein the one or more processors, to generate the refined fit-for-purpose score for the target process automation based on the initial fit-for-purpose score and the historical data, are configured to:
   identify one or more of the prior implementations that substantially match the target process automation;
   identify one or more historical fit-for-purpose scores associated with the one or more of the prior implementations;
   identify historical time, effort, and results associated with the one or more of the prior implementations; and
   generate the refined fit-for-purpose score based on the initial fit-for-purpose score, the one or more historical fit-for-purpose scores, and the historical time, effort, and results.

10. The device of claim 7, wherein the one or more processors, to determine the recommendations for the target process automation based on the refined fit-for-purpose score and historical recommendations provided in the historical data, are configured to:
   identify a set of the historical recommendations associated with the prior implementations that substantially match the target process automation; and
   determine the recommendations for the target process automation based on the set of the historical recommendations.

11. The device of claim 7, wherein the recommendations include one or more of:
   a recommendation to adapt the tools of the target process automation,
   a recommendation to review process gaps in the target process automation,
   a recommendation to upgrade functions of available tools for the target process automation, or
   a recommendation to utilize existing tools for the target process automation.

12. The device of claim 7, wherein the one or more processors, to perform the one or more of the recommendations, are configured to one or more of:
   cause the target process automation to be implemented based on the refined fit-for purpose score;
   forgo implementation of the target process automation based on the refined fit-for purpose score; or
   cause a request for financing the target process automation to be generated and submitted.

13. The device of claim 7, wherein the one or more processors, to perform the one or more of the recommendations, are configured to:
   cause an order for one or more tools to be placed for the target process automation.

14. A non-transitory computer-readable medium storing a set of instructions, the set of instructions comprising:
   one or more instructions that, when executed by one or more processors of a device, cause the device to:
      receive input data identifying variables and features associated with a target process automation;
      process the input data, with a machine learning model, to calculate a future process score, a future integration score, a current process score, and a current integration score, wherein the future process score corresponds to a score associated with a process of the target process automation, the future integration score corresponds to a score associated with integration of tools of the target process automation with tools of one or more current processes identified in the input data, the current process score corresponds to a score associated with the one or more current processes, and the current integration score corresponds to a score associated with integration of the tools of the one or more current processes, wherein processing the input data, with the machine learning model, to calculate the future process score, the future integration score, the current process score, and the current integration score comprises:
         multiplying a first plurality of tool scores, associated with the tools of the target process automation, by first normalized priority weights to generate a first plurality of weighted tool scores;
         aggregating the first plurality of weighted tool scores to generate the future process score;
         multiplying the first plurality of tool scores by second normalized priority weights to generate a second plurality of weighted tool scores;
         aggregating the second plurality of weighted tool scores to generate the future integration score;
         multiplying a second plurality of tool scores, associated with tools of the prior implementations, by the first normalized priority weights to generate a third plurality of weighted tool scores;
         aggregating the third plurality of weighted tool scores to generate the current process score;
         multiplying the second plurality of tool scores by the second normalized priority weights to generate a fourth plurality of weighted tool scores; and
         aggregating the fourth plurality of weighted tool scores to generate the current integration score;
      calculate a combined score based on the future process score, the future integration score, the current process score, and the current integration score;
      calculate a calibrated combined score based on the combined score and a calibration factor derived from historical data identifying prior implementations and assets associated with the target process;
      calculate an initial fit-for-purpose score for the target process automation based on the calibrated combined score and a probability metric;
      generate a refined fit-for-purpose score for the target process automation based on the initial fit-for-purpose score and the historical data;
      determine recommendations for the target process automation based on the refined fit-for-purpose score and historical recommendations provided in the historical data;
      automatically perform one or more of the recommendations, wherein automatically performing the one or more of the recommendations comprises:
         providing the refined fit-for-purpose score and the one or more of the recommendations for display; and
         retraining the machine learning model based on the one or more of the recommendations and the refined fit-for-purpose score, as a feedback to the machine learning model; and
      automatically implement changes to hardware and/or software of a target system to achieve the target process automation based on the one or more recommendations.

15. The non-transitory computer-readable medium of claim 14, wherein the one or more instructions, that cause the device to calculate the combined score based on the future process score, the future integration score, the current process score, and the current integration score, cause the device to:
   add the future process score and the future integration score to generate a first sum;
   add the current process score and the current integration score to generate a second sum; and
   subtract the second sum from the first sum to calculate the combined score.

16. The non-transitory computer-readable medium of claim 14, wherein the one or more instructions, that cause the device to calculate the calibrated combined score based on the combined score the calibration factor derived from the historical data, cause the device to:
   divide the combined score by the calibration factor to calculate the calibrated combined score.

17. The non-transitory computer-readable medium of claim 14, wherein the one or more instructions, that cause the device to calculate the initial fit-for-purpose score for the target process automation based on the calibrated combined score and the probability metric, cause the device to:
- divide the calibrated combined score by the probability metric to generate a value; and
- scale the value, based on a scale, to calculate the initial fit-for-purpose score for the target process automation.

18. The non-transitory computer-readable medium of claim 14, wherein the one or more instructions, that cause the device to generate the refined fit-for-purpose score for the target process automation based on the initial fit-for-purpose score and the historical data, cause the device to:
- identify one or more of the prior implementations that substantially match the target process automation;
- identify one or more historical fit-for-purpose scores associated with the one or more of the prior implementations;
- identify historical time, effort, and results associated with the one or more of the prior implementations; and
- generate the refined fit-for-purpose score based on the initial fit-for-purpose score, the one or more historical fit-for-purpose scores, and the historical time, effort, and results.

* * * * *